H. J. PENNINGTON-HAYWARD.
SIGNALING DEVICE.
APPLICATION FILED OCT. 15, 1912.

1,171,638.

Patented Feb. 15, 1916.

UNITED STATES PATENT OFFICE.

HARRY JOSEPH PENNINGTON-HAYWARD, OF BIRMINGHAM, ENGLAND.

SIGNALING DEVICE.

1,171,638.  Specification of Letters Patent.  Patented Feb. 15, 1916.

Application filed October 15, 1912. Serial No. 725,935.

*To all whom it may concern:*

Be it known that I, HARRY JOSEPH PENNINGTON-HAYWARD, of 85 John Bright street, Birmingham, in the county of Warwick, England, have invented certain new and useful Improvements in and connected with Signaling Devices for Use on Motor Road-Vehicles, Aeroplanes, and the like, of which the following is a specification.

This invention relates to a signaling device of the type used on motor road vehicles, aeroplanes, and the like, to indicate to the driver of a rear or approaching vehicle, or pedestrian, the direction of travel of the front vehicle, and the driver's intention of turning to either the right or the left; and the invention consists essentially of one or more tubular supports having enlarged or bell-mouthed ends adapted to normally cover a signal, said supports being mounted horizontally upon a suitable part of the vehicle, and the parts of the device being so constructed, proportioned and operated that the signal can, when required, be projected out of the enlarged ends of the support to indicate the direction in which the vehicle will turn, as hereinafter set forth.

Figure 1:
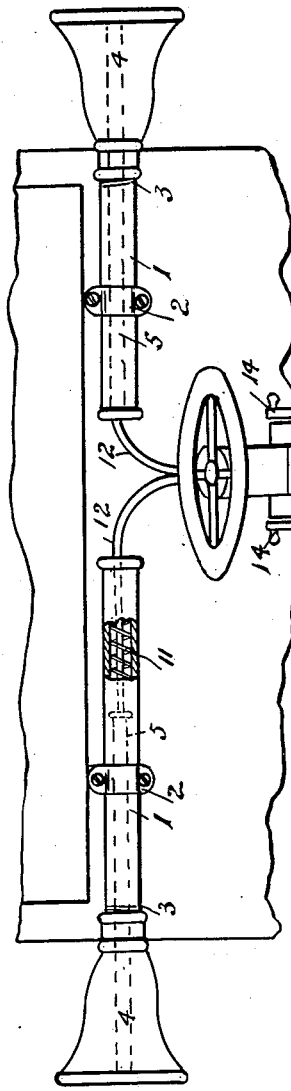
Figure 3:
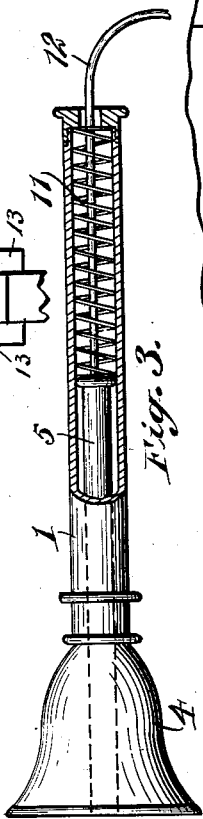
Figure 2:
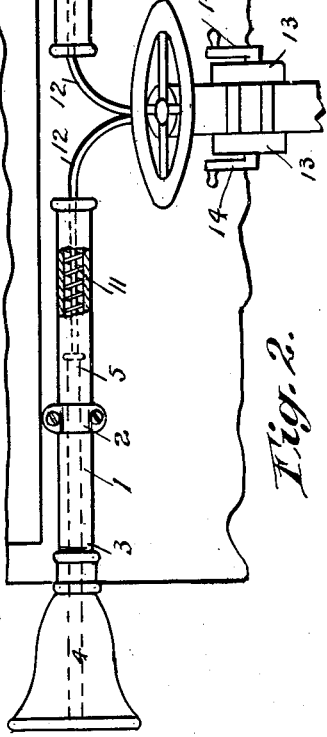

Referring to the drawings: Figure 1, is an elevation of the signaling device fixed to a portion of a motor car and constructed in accordance with this invention, and adapted to be operated by a flexible wire cable; and, Fig. 2, is a similar view to Fig. 1, but showing one of the signals projecting out of and beyond one of the supports. Fig. 3, is a detail view, partly in section, showing the relation of the rod, cable and spring within the support.

Referring to the drawings, the supports 1 are each of a tubular form and are constructed to be secured to the desired part of the vehicle or the like by means of lugs 2, the outer ends 3 of each support having a bell-mouth 4. Two rods or tubes 5 of suitable length are slidably secured within the supports and the outer ends of said rods or tubes carry signals 7, which normally lie within the enlarged or bell-mouthed ends of the supports. Springs 11 contained within the supports 1 bear against the rods 5 to press them outward when the cables 12 are released. When one or other of the rods or tubes 5 is moved outward, the corresponding signal 7 is projected out of the enlarged end of its respective support, to indicate whether the driver intends turning to the right or left.

To each of the inner ends of the rods 5 is attached a wire cable 12, the other ends of the cables being each connected to a ratchet control or drum 13 fitted upon the steering pillar, each drum being provided with a suitable handle 14 to allow of each cable being released independently of the other for the purpose of causing the rods 5 to slide outward beyond the bell-mouthed ends of the support, through the medium of the controlling springs 11, and thus project the signals beyond the support.

I claim:

A signaling device comprising two tubular supports each having a bell-mouthed end, a rod slidably mounted within each of said tubular supports and provided with springs which project the rods outwardly through the bell-mouthed ends, signals attached to said rods and normally contained within the bell-mouthed ends of said supports, cables attached to the inner ends of said rods, and controlling means for the cables to draw the signals within the bell-mouthed ends, said controlling means permitting of each cable being released independently of the other, so that its respective rod and signal can move out beyond its respective bell-mouthed end of the support under the influence of said spring.

In witness whereof I have set my hand at Birmingham this 1st day of October one thousand nine hundred and twelve in the presence of two subscribing witnesses.

HARRY JOSEPH PENNINGTON-HAYWARD.

Witnesses:
WALKER BARTLANN,
ERNEST HARKER.